US010774251B2

(12) United States Patent
Eckel et al.

(10) Patent No.: US 10,774,251 B2
(45) Date of Patent: Sep. 15, 2020

(54) FUNCTIONAL ABRASIVE PARTICLES, ABRASIVE ARTICLES, AND METHODS OF MAKING THE SAME

(71) Applicant: 3M INNOVATIVE PROPERTIES COMPANY, St. Paul, MN (US)

(72) Inventors: Joseph B. Eckel, Vadnais Heights, MN (US); Aaron K. Nienaber, Maplewood, MN (US); Yuyang Liu, St. Paul, MN (US); Don V. West, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/342,770

(22) PCT Filed: Oct. 5, 2017

(86) PCT No.: PCT/US2017/055360
§ 371 (c)(1),
(2) Date: Apr. 17, 2019

(87) PCT Pub. No.: WO2018/080756
PCT Pub. Date: May 3, 2018

(65) Prior Publication Data
US 2019/0249052 A1 Aug. 15, 2019

Related U.S. Application Data

(60) Provisional application No. 62/412,405, filed on Oct. 25, 2016.

(51) Int. Cl.
*C09K 3/14* (2006.01)
*B24D 3/00* (2006.01)
*B24D 3/02* (2006.01)

(52) U.S. Cl.
CPC .......... *C09K 3/1436* (2013.01); *C09K 3/1427* (2013.01)

(58) Field of Classification Search
CPC ... B24D 3/00; B24D 3/02; C09K 3/14; C09K 3/1409; C09K 3/1436; C09K 3/1445; C09K 3/1427
See application file for complete search history.

(56) References Cited

U.S. PATENT DOCUMENTS 1,930,788 A 10/1933 Buckner
2,370,636 A 3/1945 Carlton
(Continued)

FOREIGN PATENT DOCUMENTS

CN 1830626 9/2006
CN 101353566 1/2009
(Continued)

OTHER PUBLICATIONS

Rampal, "Comparing the Magnetic Abrasives by Investigating the Surface Finish", Journal of Engineering, Computers & Applied Sciences (JEC&AS), Oct. 2012, vol. 1, No. 1, pp. 20-24.
(Continued)

*Primary Examiner* — Pegah Parvini
(74) *Attorney, Agent, or Firm* — Bradford B. Wright

(57) ABSTRACT

A functional abrasive particle comprises a ceramic body having at least one hole extending therethrough. A functional material is at least partially disposed within the hole. The functional material contains a binder and functional particles that are magnetizable, metallic, or both. Methods of making functional abrasive particles, and abrasive articles including them are also disclosed.

15 Claims, 9 Drawing Sheets

(56) References Cited

U.S. PATENT DOCUMENTS

| | | | |
|---|---|---|---|
| 2,857,879 A | 10/1958 | Johnson | |
| 2,947,616 A | 8/1960 | Coes, Jr. | |
| 2,958,593 A | 11/1960 | Hoover | |
| 3,306,719 A | 2/1967 | Fringhian | |
| 3,495,960 A | 2/1970 | Schladitz | |
| 3,625,666 A | 12/1971 | James | |
| 3,918,217 A | 11/1975 | Oliver | |
| 4,008,055 A | 2/1977 | Phaal | |
| 4,018,575 A | 4/1977 | Davis | |
| 4,111,713 A * | 9/1978 | Beck | B29C 70/66 106/409 |
| 4,227,350 A | 10/1980 | Fitzer | |
| 4,246,004 A | 1/1981 | Busch | |
| 4,314,827 A | 2/1982 | Leitheiser | |
| 4,331,453 A | 5/1982 | Dau | |
| 4,609,380 A | 9/1986 | Barnett | |
| 4,623,364 A | 11/1986 | Cottringer | |
| 4,652,275 A | 3/1987 | Bloecher | |
| 4,685,937 A * | 8/1987 | Hori | C04B 35/651 51/293 |
| 4,734,104 A | 3/1988 | Broberg | |
| 4,744,802 A | 5/1988 | Schwabel | |
| 4,751,137 A | 6/1988 | Halg | |
| 4,770,671 A | 9/1988 | Monroe | |
| 4,800,685 A | 1/1989 | Haynes, Jr. | |
| 4,881,951 A | 11/1989 | Wood | |
| 4,898,597 A | 2/1990 | Hay | |
| 4,916,869 A | 4/1990 | Oliver | |
| 4,933,373 A | 6/1990 | Moren | |
| 4,991,362 A | 2/1991 | Heyer | |
| 5,009,675 A | 4/1991 | Kunz | |
| 5,137,542 A | 8/1992 | Buchanan | |
| 5,152,917 A | 10/1992 | Pieper | |
| 5,181,939 A | 1/1993 | Neff | |
| 5,201,916 A | 4/1993 | Berg | |
| 5,213,591 A | 5/1993 | Celikkaya | |
| 5,282,875 A | 2/1994 | Wood | |
| 5,366,523 A | 11/1994 | Rowenhorst | |
| 5,380,390 A | 1/1995 | Tselesin | |
| 5,417,726 A | 5/1995 | Stout | |
| 5,435,816 A | 7/1995 | Spurgeon | |
| 5,500,273 A | 3/1996 | Holmes | |
| 5,554,068 A | 9/1996 | Carr | |
| 5,573,619 A | 11/1996 | Benedict | |
| 5,591,239 A | 1/1997 | Larson | |
| RE35,570 E | 7/1997 | Rowenhorst | |
| 5,672,097 A | 9/1997 | Hoopman | |
| 5,681,361 A | 10/1997 | Sanders, Jr. | |
| 5,712,210 A | 1/1998 | Windisch | |
| 5,817,204 A | 10/1998 | Tselesin | |
| 5,858,140 A | 1/1999 | Berger | |
| 5,891,204 A | 4/1999 | Neff | |
| 5,928,070 A | 7/1999 | Lux | |
| 5,942,015 A | 8/1999 | Culler | |
| 5,946,991 A | 9/1999 | Hoopman | |
| 5,975,987 A | 11/1999 | Hoopman | |
| 5,984,988 A | 11/1999 | Berg | |
| 6,017,831 A | 1/2000 | Beardsley | |
| 6,083,631 A | 7/2000 | Neff | |
| 6,120,568 A | 9/2000 | Neff | |
| 6,129,540 A | 10/2000 | Hoopman | |
| 6,207,246 B1 | 3/2001 | Moren | |
| 6,261,682 B1 | 7/2001 | Law | |
| 6,302,930 B1 | 10/2001 | Lux | |
| 6,790,126 B2 | 9/2004 | Wood | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 8,262,758 B2 | 9/2012 | Gao | |
| 8,845,773 B2 | 9/2014 | Erickson | |
| 2005/0218566 A1 | 10/2005 | Suzuki | |
| 2008/0131705 A1 | 6/2008 | Colburn | |
| 2008/0289262 A1 | 11/2008 | Gao | |
| 2009/0165394 A1 | 7/2009 | Culler | |
| 2009/0169816 A1 | 7/2009 | Erickson | |
| 2010/0151201 A1 * | 6/2010 | Erickson | C09K 3/1418 428/148 |
| 2010/0213131 A1 * | 8/2010 | Linford | B01J 20/282 210/656 |
| 2011/0088330 A1 | 4/2011 | Beekman | |
| 2012/0227333 A1 | 9/2012 | Adefris | |
| 2013/0040537 A1 | 2/2013 | Schwabel | |
| 2013/0125477 A1 | 5/2013 | Adefris | |
| 2013/0203328 A1 | 8/2013 | Givot | |
| 2013/0244552 A1 | 9/2013 | Lee | |
| 2013/0252521 A1 | 9/2013 | Kasashima | |
| 2013/0252522 A1 | 9/2013 | Kasashima | |
| 2013/0344786 A1 | 12/2013 | Keipert | |
| 2014/0106126 A1 | 4/2014 | Gaeta | |
| 2014/0162455 A1 * | 6/2014 | Carswell | H01L 21/30625 438/692 |
| 2014/0237907 A1 | 8/2014 | Boden | |
| 2014/0290147 A1 | 10/2014 | Seth | |
| 2014/0291895 A1 | 10/2014 | Kanade | |
| 2015/0165722 A1 * | 6/2015 | Yasaee | C25D 15/00 428/58 |
| 2015/0267097 A1 | 9/2015 | Rosenflanz | |
| 2015/0291865 A1 | 10/2015 | Breder | |
| 2016/0221153 A1 | 8/2016 | Rizzo, Jr. | |
| 2016/0375538 A1 * | 12/2016 | Lambourne | B24B 1/005 451/5 |

FOREIGN PATENT DOCUMENTS

| | | |
|---|---|---|
| CN | 103590090 | 2/2014 |
| CN | 104191385 | 12/2014 |
| CN | 104999385 | 10/2015 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 1122718 A2 | 8/2001 |
| GB | 396231 | 8/1933 |
| GB | 1477767 | 6/1977 |
| JP | 63232947 | 9/1988 |
| JP | 0778509 | 3/1995 |
| JP | 11165252 | 6/1999 |
| JP | 2002053367 | 2/2002 |
| JP | 2004098265 | 4/2004 |
| JP | 2004098266 | 4/2004 |
| JP | 2005153106 | 6/2005 |
| JP | 2006089586 | 4/2006 |
| JP | 2012131017 | 7/2012 |
| JP | 2012131018 | 7/2012 |
| JP | 2015155142 | 8/2015 |
| SU | 1495100 | 7/1989 |
| WO | WO 94-27833 | 12/1994 |
| WO | WO 2010-041645 | 4/2010 |
| WO | WO 2012-112305 | 8/2012 |
| WO | WO 2015-048768 | 4/2015 |
| WO | WO 2015-100020 | 7/2015 |
| WO | WO 2015-100220 | 7/2015 |
| WO | WO 2016-044158 | 3/2016 |
| WO | WO 2016-064726 | 4/2016 |
| WO | WO 2016-081302 | 5/2016 |
| WO | WO 2017-136188 | 8/2017 |
| WO | WO 2018-080703 | 5/2018 |
| WO | WO 2018-080704 | 5/2018 |
| WO | WO 2018-080705 | 5/2018 |
| WO | WO 2018-080755 | 5/2018 |

(56) References Cited

FOREIGN PATENT DOCUMENTS

| WO | WO 2018-080784 | 5/2018 |
| WO | WO 2018-080799 | 5/2018 |

OTHER PUBLICATIONS

International Search Report for PCT International Application No. PCT/US2017/055360, dated Jan. 19, 2018, 4 pages.

\* cited by examiner

US 10,774,251 B2

FUNCTIONAL ABRASIVE PARTICLES, ABRASIVE ARTICLES, AND METHODS OF MAKING THE SAME

TECHNICAL FIELD

The present disclosure broadly relates to abrasive particles, abrasive articles, and methods of making them.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive particles include abrasive particles retained in a first binder that can be resinous or vitreous. Examples include, grindstones, cutoff wheels, off-angle grinding wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles have been used to align crushed abrasive particles with the longitudinal axes perpendicular to the backing. Likewise, shaped abrasive particles have been aligned by mechanical methods as disclosed in U.S. Pat. Appl. Publ. No. 2013/0344786 A1 (Keipert).

Precise placement and orientation of abrasive particles in bonded abrasive articles has been described in the patent literature. For example, U.S. Pat. No. 1,930,788 (Buckner) describes the use of magnetic flux to orient abrasive grain having a thin coating of iron dust in bonded abrasive articles. Likewise, British (GB) Pat. No. 396,231 (Buckner) describes the use of a magnetic field to orient abrasive grain having a thin coating of iron or steel dust to orient the abrasive grain in bonded abrasive articles. Using this technique, abrasive particles were radially oriented in bonded wheels.

U.S. Pat. Appl. Publ. No. 2008/0289262 A1 (Gao) discloses equipment for making abrasive particles in even distribution, array pattern, and preferred orientation. Using electric current to form a magnetic field causing acicular soft magnetic metallic sticks to absorb or release abrasive particles plated with soft magnetic materials.

SUMMARY

The present inventors have discovered that functional abrasive particles with magnetic and/or metallic material disposed within respective holes extending through the particles according to the present disclosure can be manipulated using electromagnetic fields.

In one aspect, the present disclosure provides a functional abrasive particle comprising a ceramic body having at least one hole extending therethrough, and a functional material at least partially disposed within the at least one hole, wherein the functional material comprises a first binder retaining a plurality of functional particles that are magnetizable, metallic, or a combination thereof.

In another aspect, the present disclosure provides a plurality of abrasive particles according to the present disclosure.

In yet another aspect, the present disclosure provides an abrasive article comprising a plurality of abrasive particles, wherein at least a majority of the abrasive particles comprise functional abrasive particles according to the present disclosure retained in a second binder.

As used herein:

The term "ceramic" refers to any of various hard, brittle, heat- and corrosion-resistant materials made of at least one metallic element (which may include silicon) combined with oxygen, carbon, nitrogen, or sulfur.

The term "conductive" means electrically conductive (e.g., at the level of a conductor), unless otherwise specified.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., unless otherwise specified.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 Gauss (1 mT), preferably at least about 100 Gauss (10 mT).

The term "magnetizable" means capable of being magnetized or already in a magnetized state.

The term "shaped ceramic body" refers to a ceramic body that has been intentionally shaped (e.g., extruded, die cut, molded, screen-printed) at some point during its preparation such that the resulting ceramic body is non-randomly shaped. The term "shaped ceramic body" as used herein excludes ceramic bodies obtained by a mechanical crushing or milling operation.

The terms "precisely-shaped ceramic body" refers to a ceramic body wherein at least a portion of the ceramic body has a predetermined shape that is replicated from a mold cavity used to form a precursor precisely-shaped ceramic body that is sintered to form the precisely-shaped ceramic body. A precisely-shaped ceramic body will generally have a predetermined geometric shape that substantially replicates the mold cavity that was used to form the shaped abrasive particle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "substantially" means within 35 percent (preferably within 30 percent, more preferably within 25 percent, more preferably with 20 percent, more preferably within 10 percent, and more preferably within 5 percent) of the attribute being referred to.

Features and advantages of the present disclosure will be further understood upon consideration of the detailed description as well as the appended claims.

Figure 1:
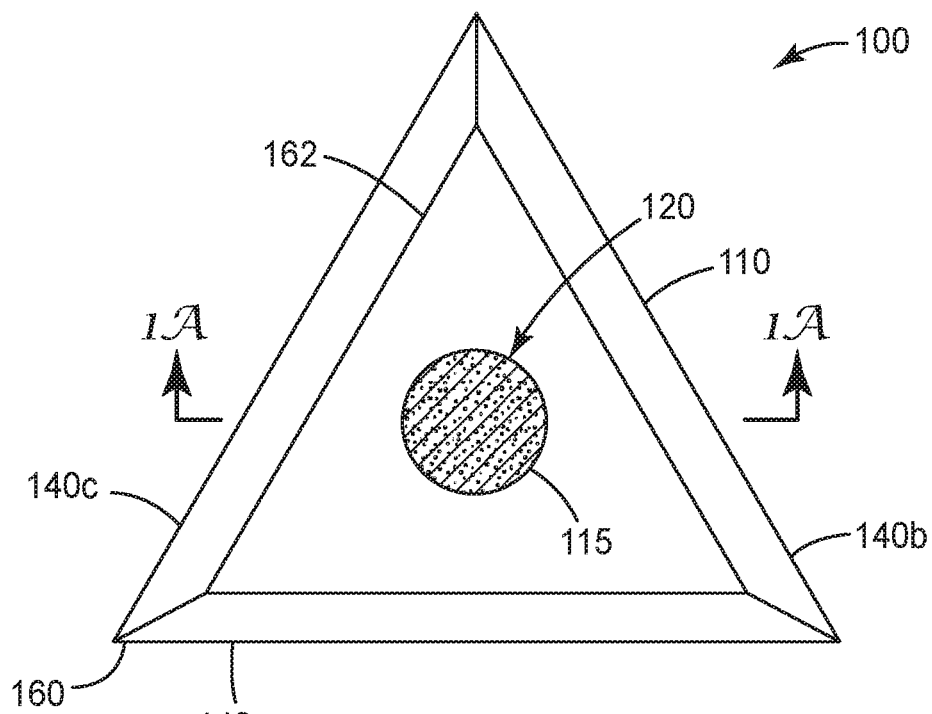
FIG. 1 is a schematic top view of an exemplary functional abrasive particle 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Figure 1A:
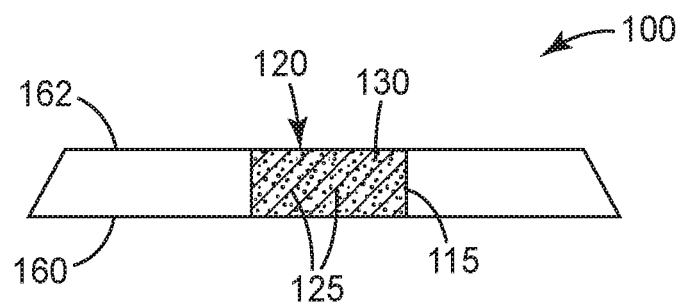
FIG. 1A is a schematic cross-sectional view of an exemplary functional abrasive particle 100 take along line 1A-1A.

Referring now to FIGS. 1 and 1A, functional abrasive particle 100 comprises precisely-shaped ceramic body 110 (shown as a triangular platelet) and functional material 120 disposed within hole 115. Functional material 120 preferably comprises functional particles 125 retained in a first binder 130. Ceramic body 110 has two opposed major surfaces 160, 162 connected to each other by three side surfaces 140a, 140b, 140c. Hole 115 extends through ceramic body 110 and between the first and second major surfaces 160, 162. Functional material 120 is disposed within hole 115.

Figure 2:
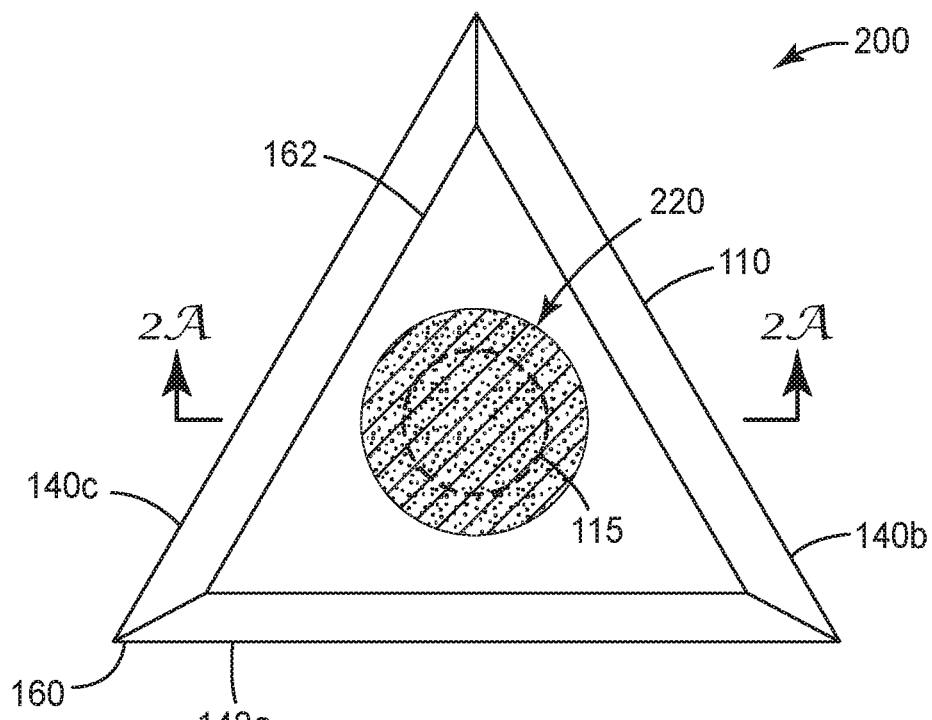
FIG. 2 is a schematic top view of an exemplary magnetizable abrasive particle 200 according to the present disclosure.
Figure 2A:
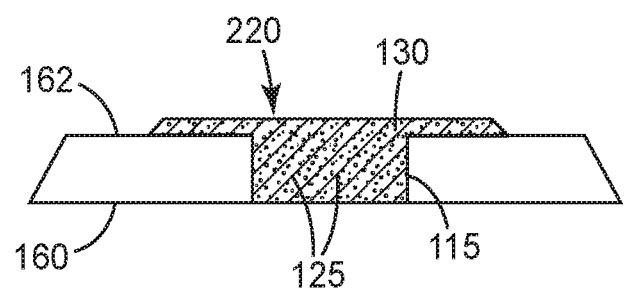
FIG. 2A is a schematic cross-sectional view of an exemplary magnetizable abrasive particle 200 take along line 2A-2A.

In a second configuration, shown in FIGS. 2 and 2A, functional abrasive particle 200 comprises precisely-shaped ceramic body 110 and functional material 220. Functional material 220 preferably comprises functional particles 125 retained in first binder 130. Ceramic body 110 has two opposed major surfaces 160, 162 connected to each other by three side surfaces 140a, 140b, 140c. Hole 115 extends through ceramic body 110 and between the first and second major surfaces 160, 162. Functional material 220 is disposed within hole 115 and also extends as a partial coating on major surface 162.

Useful functional materials include magnetizable materials and/or metallic materials (e.g., that are sufficiently electrically conductive to be useful for induction heating, microwave heating, and/or electrostatic coating). Functional materials may be both magnetizable and metallic in some cases.

The functional material may comprise functional particles in a first binder. Suitable binders may be vitreous or organic, for example, as described for the first binder 130 hereinbelow. The first binder may be, for example selected from those vitreous and organic binders listed hereinabove, for example. The ceramic body can be any ceramic material (preferably a ceramic abrasive material), for example, selected from among the ceramic (i.e., not including diamond) abrasive materials listed hereinbelow. The functional material may be disposed on the ceramic body by any suitable method such as, for example, extrusion, brush coating, nozzle jet coating, and powder coating. Individual functional abrasive particles may have functional materials with different degrees of coverage and/or locations of coverage. Excess functional material that may exist on one or more of the outer surfaces of the functional abrasive particles after coating may optionally be removed by mechanical agitation, optionally with added milling media.

The first binder of the functional material can be inorganic (e.g., vitreous) or organic resin-based, and is typically formed from a respective binder precursor.

Glassy vitreous binders may be made from a vitreous binder precursor comprising a mixture of different metal oxides. Examples of these metal oxide vitreous binders include silica, alumina, calcia, iron oxide, titania, magnesia, sodium oxide, potassium oxide, lithium oxide, manganese oxide, boron oxide, phosphorous oxide, and the like. Specific examples of vitreous binders based upon weight include, for example, 47.61 percent $SiO_2$, 16.65 percent $Al_2O_3$, 0.38 percent $Fe_2O_3$, 0.35 percent $TiO_2$, 1.58 percent CaO, 0.10 percent MgO, 9.63 percent $Na_2O$, 2.86 percent $K_2O$, 1.77 percent $Li_2O$, 19.03 percent $B_2O_3$, 0.02 percent $MnO_2$, and 0.22 percent $P_2O_5$; and 63 percent $SiO_2$, 12 percent $Al_2O_3$, 1.2 percent CaO, 6.3 percent $Na_2O$, 7.5 percent $K_2O$, and 10 percent $B_2O_3$. Still other examples of vitreous binder based upon a molar ratio include 3.77 percent $SiO_2$, 0.58 percent $Al_2O_3$, 0.01 percent $Fe_2O_3$, 0.03 percent $TiO_2$, 0.21 percent CaO, 0.25 percent MgO, 0.47 percent $Na_2O$, and 0.07 percent $K_2O$.

During manufacture, the vitreous binder precursor, in a powder form, may be mixed with a temporary binder, typically an organic binder (e.g., starch, sucrose, mannitol), which burns out during firing of the vitreous binder precursor.

Vitrified binder precursors may also be formed from a frit, for example anywhere from about one to 100 percent frit, but generally 20 to 100 percent frit. Some examples of common materials used in frit binders include feldspar, borax, quartz, soda ash, zinc oxide, whiting, antimony trioxide, titanium dioxide, sodium silicofluoride, flint, cryolite, boric acid, and combinations thereof. These materials are usually mixed together as powders, fired to fuse the mixture, and then cooled. The cooled mixture is crushed and screened to a very fine powder to then be used as a vitreous binder precursor. The temperature at which these frit binder precursors are matured is dependent upon its chemistry, but may range from anywhere from about 600° C. to about 1800° C.

Additional inorganic binders (e.g., ceramic binders) useful as the first binder in abrasive particles are described in U.S. Pat. No. 6,790,126 (Wood et al.).

Organic binders (e.g., crosslinked organic polymers) are generally prepared by curing (i.e., crosslinking) a resinous organic binder precursor. Examples of suitable organic binder precursors include thermally-curable resins and radiation-curable resins, which may be cured, for example, thermally and/or by exposure to radiation. Exemplary organic binder precursors include glues, phenolic resins, aminoplast resins, urea-formaldehyde resins, melamine-formaldehyde resins, urethane resins, acrylic resins (e.g., aminoplast resins having pendant α,β-unsaturated groups, acrylated urethanes, acrylated epoxy resins, acrylated isocyanurates), acrylic monomer/oligomer resins, epoxy resins (including bismaleimide and fluorene-modified epoxy resins), isocyanurate resins, an combinations thereof. Curatives such as thermal initiators, catalysts, photoinitiators, hardeners, and the like may be added to the organic binder precursor, typically selected and in an effective amount according to the resin system chosen.

Firing/sintering of vitreous binders can be done, for example, in a kiln or tube furnace using techniques known in the art. Conditions for curing organic binder precursors may include heating in an oven or with infrared radiation and/or actinic radiation (e.g., in the case of photoinitiated cure) using techniques known in the art.

Useful abrasive materials that can be used as include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles suitable for use as ceramic bodies can be found, for example, in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

Further details concerning methods of making sol-gel-derived ceramic particles suitable for use as ceramic bodies can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The ceramic body may be shaped (e.g., precisely-shaped) or random (e.g., crushed). Shaped abrasive particles and precisely-shaped ceramic bodies may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/U.S. Pat. No. 0,227,333 (Adefris et al.); 2013/U.S. Pat. No. 0,040,537 (Schwabel et al.); and 2013/0125477 (Adefris).

Exemplary magnetizable functional particles may comprise at least one magnetizable material such as: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some preferred embodiments, the magnetizable particles comprise at least one metal selected from iron, nickel, and cobalt, an alloy of two or more such metals, or an alloy of at one such metal with at least one element selected from phosphorus and manganese. In some preferred embodiments, the magnetizable material is an alloy containing 8 to 12 weight percent (wt. %) aluminum, 15 to 26 wt. % nickel, 5 to 24 wt. % cobalt, up to 6 wt. % copper, up to 1% titanium, wherein the balance of material to add up to 100 wt. % is iron.

Useful metallic functional particles may comprise any metallic (i.e., elemental metal or alloy thereof) material exclusive of substantially pure elements from Group 1 and Group 2 of the Periodic Table of the elements. Preferred metals include iron, cobalt, nickel, aluminum, silver, gold, platinum, palladium, chromium, tungsten, tin, bismuth, lead, copper, tantalum, alloys of any of the foregoing containing carbon (e.g., steel and stainless steel), silicon, and/or phosphorus, and combinations thereof.

Preferably, the functional material is predominantly disposed within the hole(s) extending through each functional abrasive particle. For example, for individual functional particles, at least 50 percent, at least 60 percent, at least 70 percent, at least 80 percent, at least 90 percent, or even all of the functional material may be disposed in a hole or holes extending through the ceramic body.

At least one hole, preferably one, extends through the functional abrasive particles, although in some case multiple holes (e.g., 2, 3, or 4 holes, or more) may be desirable.

The functional particles may have any size, but are preferably much smaller than the ceramic bodies as judged by average particle diameter, preferably 4 to 2000 times smaller, more preferably 100 to 2000 times smaller, and even more preferably 500 to 2000 times smaller, although other sizes may also be used. In this embodiment, the functional particles may have a Mohs hardness of 6 or less (e.g., 5 or less, or 4 or less), although this is not a requirement.

Functional abrasive particles according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10000.

Alternatively, the functional abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the functional abrasive particles pass through a test sieve meeting ASTM E-11 specifications for the number 18 sieve and are retained on a test sieve meeting ASTM E-11 specifications for the number 20 sieve. In one embodiment, functional abrasive particles have a particle size such that most of the particles pass through an 18 mesh test sieve and can be retained on a 20, 25, 30, 35, 40, 45, or 50 mesh test sieve. In various embodiments, the functional abrasive particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

Functional abrasive particles according to the present disclosure can be prepared, for example, by applying a functional material precursor to the ceramic body. The functional material precursor may be provided as a dispersion or slurry in a liquid vehicle. The dispersion or slurry vehicle and can be made by simple mixing of its components (e.g., functional particles, optional binder precursor, and liquid vehicle), for example. Exemplary liquid vehicles include water, alcohols (e.g., methanol, ethanol, propanol, butanol, ethylene glycol monomethyl ether), ethers (e.g., glyme, diglyme), and combinations thereof. The dispersion or slurry may contain additional components such as, for example, dispersant, surfactant, mold release agent, colorant, defoamer, and rheology modifier. Typically, after coating onto the ceramic bodies the functional material precursor is dried to remove most or all of the liquid vehicle, although this is not a requirement. If a curable binder precursor is used, then a curing step (e.g., heating and/or exposure to actinic radiation) generally follows to provide the functional material.

For production of abrasive articles, a magnet or electromagnet generating a magnetic field can optionally be used to place and/or orient the functional abrasive particles prior to curing the binder (e.g., vitreous or organic) precursor to produce the abrasive article. The magnetic field may be substantially uniform over the functional abrasive particles before they are fixed in position in the binder or continuous over the entire, or it may be uneven, or even effectively separated into discrete sections. Typically, the orientation of the magnetic field is configured to achieve alignment of the functional abrasive particles according to a predetermined orientation.

Examples of magnetic field configurations and apparatuses for generating them are described in U.S. Pat. Appln. Publ. No. 2008/U.S. Pat. No. 0,289,262 A1 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British Pat. No. (G. B.) 1 477 767 (Edenville Engineering Works Limited).

In some embodiments, magnetic field may be used to urge the functional abrasive particles onto the make layer precursor (i.e., the binder precursor for the make layer) of a coated abrasive article while maintaining a vertical or inclined orientation relative to a horizontal backing. After at least partially curing the make layer precursor, the functional abrasive particles are fixed in their placement and orientation. Alternatively or in addition, the presence or absence of strong magnetic field can be used to selectively placed the functional abrasive particles onto the make layer precursor. An analogous process may be used for manufacture of slurry coated abrasive articles, except that the magnetic field acts on the functional particles within the slurry. The above processes may also be carried out on nonwoven backings to make nonwoven abrasive articles.

Likewise, in the case of bonded abrasive article the functional abrasive particles can be positioned and/or orientated within the corresponding binder precursor, which is then pressed and cured.

Functional abrasive particles can be used in loose form (e.g., free-flowing or in a slurry) or they may be incorporated into various abrasive articles (e.g., coated abrasive articles, bonded abrasive articles, nonwoven abrasive articles, and/or abrasive brushes).

Functional abrasive particles are useful, for example, in the construction of abrasive articles, including for example, coated abrasive articles (for example, conventional make and size coated abrasive articles, slurry coated abrasive articles, and structured abrasive articles), abrasive brushes, nonwoven abrasive articles, and bonded abrasive articles such as grinding wheels, hones and whetstones.

Figure 3:
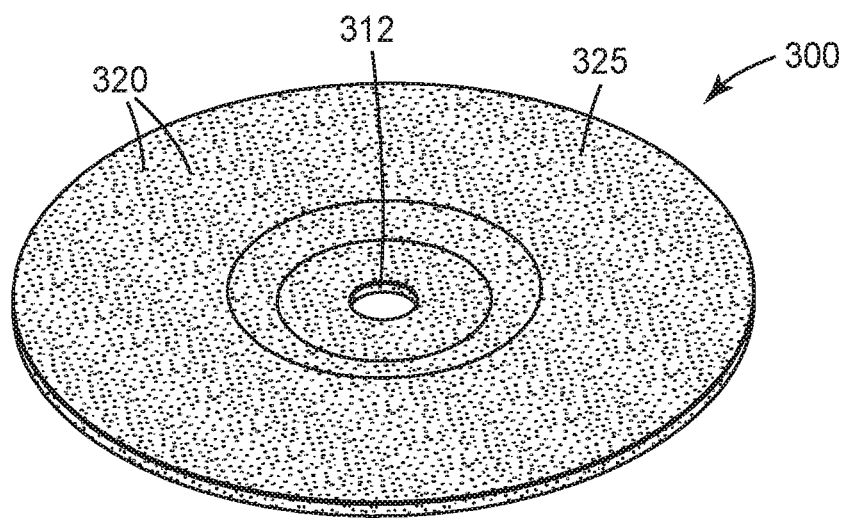
FIG. 3 is a perspective view of an exemplary bonded abrasive wheel 300 according to the present disclosure.

For example, FIG. 3 shows an exemplary embodiment of a Type 27 depressed-center grinding wheel 300 (i.e., an embodiment of a bonded abrasive article) according to one embodiment of the present disclosure. Center hole 312 is used for attaching Type 27 depressed-center grinding wheel 300 to, for example, a power driven tool. Type 27 depressed-center grinding wheel 300 comprises shaped ceramic abrasive particles 320 according to the present disclosure retained in binder 325. Examples of suitable binders 325 include: organic binders such as epoxy binders, phenolic binders, aminoplast binders, and acrylic binders; and inorganic binders such as vitreous binders.

Further details concerning the manufacture of bonded abrasive articles according to the present disclosure can be found in, for example, U.S. Pat. No. 4,800,685 (Haynes et al.); U.S. Pat. No. 4,898,597 (Hay et al.); U.S. Pat. No. 4,933,373 (Moren); and U.S. Pat. No. 5,282,875 (Wood et al.).

Figure 4:
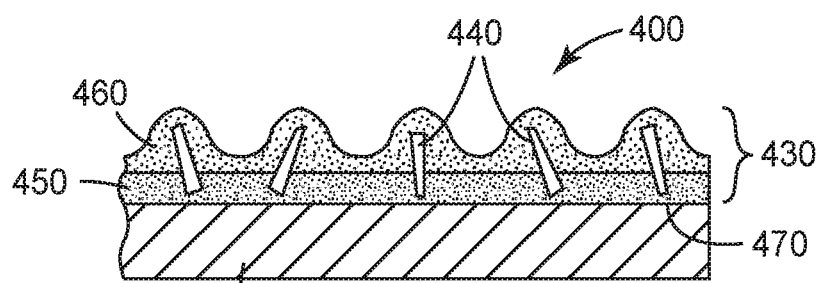
FIG. 4 is a side view of an exemplary coated abrasive article 400 according to the present disclosure.

In one exemplary embodiment of a coated abrasive article, the abrasive coat may comprise a make coat, a size coat, and functional abrasive particles. Referring to FIG. 4, exemplary coated abrasive article 400 has backing 420 and abrasive layer 430. Abrasive layer 430, includes functional abrasive particles 440 according to the present disclosure secured to backing 420 by make layer 450 and size layer 460, each comprising a respective binder (e.g., epoxy resin, urethane resin, phenolic resin, aminoplast resin, or acrylic resin) that may be the same or different. Exemplary backings include woven, knitted, or nonwoven fabrics, optionally treated with one or more of a saturant, presize layer, or tie layer.

Figure 5:
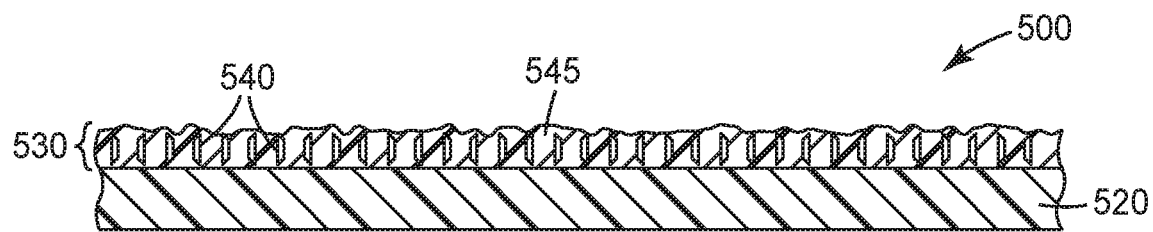
FIG. 5 is a side view of an exemplary coated abrasive article 500 according to the present disclosure.

In another exemplary embodiment of a coated abrasive article, the abrasive coat may comprise a cured slurry comprising a curable binder precursor and functional abrasive particles according to the present disclosure. Referring to FIG. 5, exemplary coated abrasive article 500 has backing 520 and abrasive layer 530. Abrasive layer 530 includes functional abrasive particles 540 and a binder 545 (e.g., epoxy resin, urethane resin, phenolic resin, aminoplast resin, acrylic resin).

Further details concerning the manufacture of coated abrasive articles according to the present disclosure can be found in, for example, U.S. Pat. No. 4,314,827 (Leitheiser et al.), U.S. Pat. No. 4,652,275 (Bloecher et al.), U.S. Pat. No. 4,734,104 (Broberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

Figure 6A:
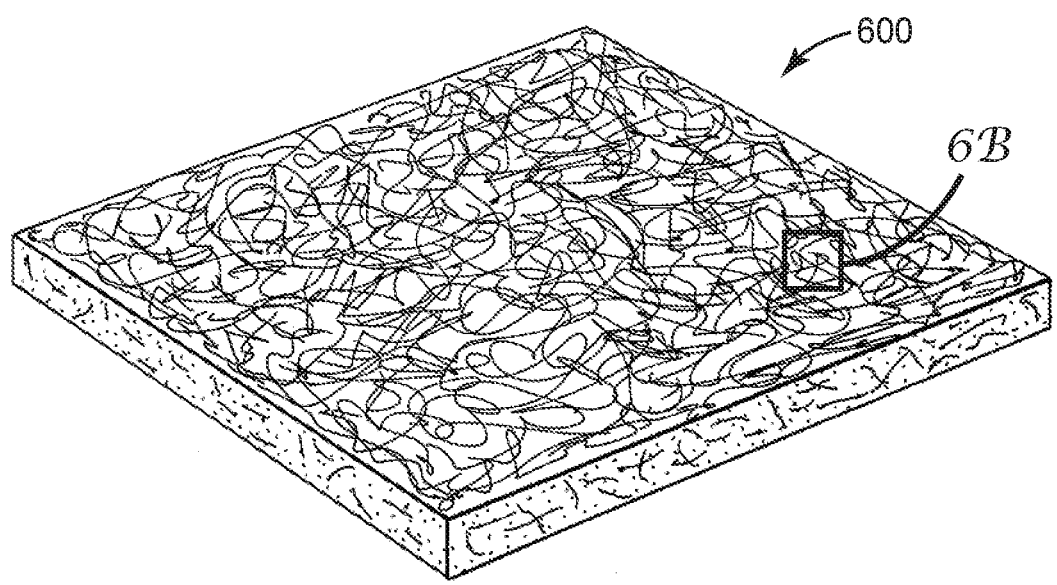
FIG. 6A is a perspective view of an exemplary nonwoven abrasive article 600 according to the present disclosure.
Figure 6B:
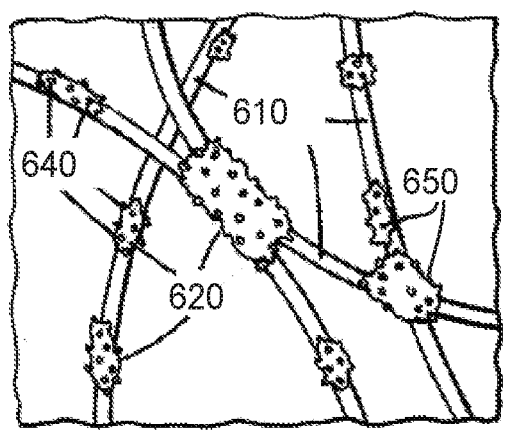
FIG. 6B is an enlarged view of region 6B in FIG. 6A.

Nonwoven abrasive articles typically include a porous (e.g., a lofty open porous) polymer filament structure having abrasive particles bonded thereto by a binder. An exemplary embodiment of a nonwoven abrasive article according to the present invention is shown in FIGS. 6A and 6B. Nonwoven abrasive article 600 includes a lofty open low-density fibrous web formed of entangled filaments 610 impregnated with binder 620 (e.g., epoxy resin, urethane resin, phenolic resin, aminoplast resin, acrylic resin). Functional abrasive particles 640 according to the present disclosure are dispersed throughout fibrous web 600 on exposed surfaces of filaments 610. Binder 620 coats portions of filaments 610 and forms globules 650, which may encircle individual filaments or bundles of filaments that adhere to the surface of the filament and/or collect at the intersection of contacting filaments, providing abrasive sites throughout the nonwoven abrasive article.

Further details concerning nonwoven abrasive articles according to the present disclosure can be found in, for example, U.S. Pat. No. 2,958,593 (Hoover et al.), U.S. Pat. No. 4,018,575 (Davis et al.), U.S. Pat. No. 4,227,350 (Fitzer), U.S. Pat. No. 4,331,453 (Dau et al.), U.S. Pat. No. 4,609,380 (Barnett et al.), U.S. Pat. No. 4,991,362 (Heyer et al.), U.S. Pat. No. 5,554,068 (Can et al.), U.S. Pat. No. 5,712,210 (Windisch et al.), U.S. Pat. No. 5,591,239 (Edblom et al.), U.S. Pat. No. 5,681,361 (Sanders), U.S. Pat. No. 5,858,140 (Berger et al.), U.S. Pat. No. 5,928,070 (Lux), U.S. Pat. No. 6,017,831 (Beardsley et al.), U.S. Pat. No. 6,207,246 (Moren et al.), and U.S. Pat. No. 6,302,930 (Lux).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

SELECT EMBODIMENTS OF THE PRESENT DISCLOSURE

In a first embodiment, the present disclosure provides a functional abrasive particle comprising a ceramic body having at least one hole extending therethrough, and a functional material at least partially disposed within the at least one hole, wherein the functional material comprises a first binder retaining a plurality of functional particles that are magnetizable, metallic, or a combination thereof.

In a second embodiment, the present disclosure provides a functional abrasive particle according to the first embodiment, wherein the ceramic body comprises a shaped ceramic body.

In a third embodiment, the present disclosure provides a functional abrasive particle according to the second embodiment, wherein the shaped ceramic body comprises a precisely-shaped ceramic body.

In a fourth embodiment, the present disclosure provides a functional abrasive particle according to any one of the first to third embodiments, wherein the ceramic body comprises a platelet having first and second opposed major facets connected to each other by a plurality of side facets, and wherein each one of said at least one hole extends from the first major facet to the second major facet.

In a fifth embodiment, the present disclosure provides a functional abrasive particle according to any one of the first to fourth embodiments, wherein the functional material completely fills the at least one hole.

In a sixth embodiment, the present disclosure provides a functional abrasive particle according to any one of the first to fifth embodiments, wherein the functional particles are magnetizable.

In a seventh embodiment, the present disclosure provides a functional abrasive particle according to the sixth embodiment, wherein the functional particles comprise an alloy of iron, silicon, and aluminum.

In an eighth embodiment, the present disclosure provides a functional abrasive particle according to any one of the first to seventh embodiments, wherein the functional particles are metallic.

In a ninth embodiment, the present disclosure provides a functional abrasive particle according to any one of the first to eighth embodiments, wherein the first binder comprises an organic binder.

In a tenth embodiment, the present disclosure provides a plurality of functional abrasive particles according to any one of the first to ninth embodiments.

In an eleventh embodiment, the present disclosure provides an abrasive article comprising a plurality of abrasive particles retained in a second binder, wherein at least a majority (e.g., at least 50 percent, at least 60 percent, at least 70 percent, at least 80 percent, at least 90 percent, or even at least 99 percent) of the abrasive particles comprise functional abrasive particles according to any one of the first to ninth embodiments.

In a twelfth embodiment, the present disclosure provides an abrasive article according to the eleventh embodiment, wherein the abrasive article comprises a bonded abrasive wheel.

In a thirteenth embodiment, the present disclosure provides an abrasive article according to the eleventh embodiment, wherein the abrasive article comprises a coated abrasive article, wherein the coated abrasive article comprises an abrasive layer disposed on a backing, and wherein the abrasive layer comprises the second binder and the plurality of abrasive particles.

In a fourteenth embodiment, the present disclosure provides an abrasive article according to the eleventh embodiment, wherein the abrasive article comprises a nonwoven abrasive, wherein the nonwoven abrasive comprises a nonwoven fiber web having an abrasive layer disposed on at least a portion thereof, and wherein the abrasive layer comprises the binder material and the plurality of abrasive particles.

In a fifteenth embodiment, the present disclosure provides an abrasive article according to any one of the eleventh to fourteenth embodiments, wherein most of the functional abrasive particles are aligned parallel to each other.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Material abbreviations used in the Examples are described in Table 1, below.

TABLE 1

| ABBREVIATION | DESCRIPTION |
|---|---|
| CB | Carbon black aqueous dispersion, obtained as KW-3729 AQUIS II from Heubach, Fairless Hills, Pennsylvania. |
| CCS | Carboxymethylcellulose sodium, obtained from Sigma-Aldrich, Saint Louis, Missouri. |
| CRY | Synthetic Cryolite powder obtained from Solvay Fluorides LLC, Alorton, Illinois. |
| IO | Iron (II, III) Oxide powder (98% purity) obtained from Alfa Aesar, Haverhill, Massachusetts. |
| PR1 | Novolac phenolic resin powder, obtained as HEXION 0224P from Momentive Specialty Chemicals, Columbus, Ohio. |
| PR2 | phenolic resin, obtained as GP 8339 R-23155B from Georgia Pacific Chemicals, Atlanta, Georgia |
| PVA | Polyvinyl alcohol, obtained as ELVANOL 51-05 from E. I. du Pont de Nemours and Company, Wilmington, Delaware. |
| REP | Repellant agent obtained as AG-E550D from AGC Chemicals Company, Exton, Pennsylvania. |
| SAP1 | Shaped abrasive particles were prepared according to the disclosure of U.S. Pat. No. 8,845,773 (Erickson et al). The shaped abrasive particles were prepared by molding alumina sol gel in equilateral triangle-shaped polypropylene mold cavities. After drying and firing, the resulting shaped abrasive particles were about 1.4 mm (side length) × 0.35 mm (thickness), with a draft angle approximately 98 degrees, and a hole with a diameter ranging from approximately 10 micrometers to 700 micrometers extending through the particle. |
| SAP2 | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped |

TABLE 1-continued

| ABBREVIATION | DESCRIPTION |
|---|---|
| | abrasive particles were about 1.4 mm (side length) × 0.35 mm (thickness), with a draft angle approximately 98 degrees. |
| SEN | Fe/Al/Si magnetizable alloy particles, obtained as SENDUST SP-3B from Mate Co., Ltd., Okayama Prefecture, Japan |
| SIL | A silica sol solution prepared as follows: an acid aqueous solution was prepared by adding 1 milliliter hydrochloric acid (35%, obtained from EMD Millipore, Billerica, Massachusetts) into 1 liter water. Then this acid aqueous solution (20 milliliter) was mixed with 20 milliliter tetraethyl orthosilicate (98%, obtained from Sigma-Aldrich, Saint Louis, Missouri) at 23° C. for 1 hour. |

Example 1

SAP1 was pre-treated as follows: SAP1 (approximately 50 grams) was added to approximately 100 grams of an aqueous solution containing 0.2% REP. After 2 minutes of soaking in the solution, SAP1 was removed from the solution with a filter, dried at 120° C. for 2 minutes and then cured at 150° C. for 1 minute.

IO (2 grams) was pre-mixed with 0.5 grams of SIL and 0.1 gram of 4% aqueous solution of CCS under mechanical agitation for 2 minutes. Pre-treated shaped abrasive grains (50 grams) were added into the pre-mix, and the resulting mixture was stirred for 5 minutes. Then the mixture was tumble dried with a master heat gun (obtained as model HG-201A from Master Appliance Corp., Racine, Wis.) for about 20 minutes.

Figure 7:
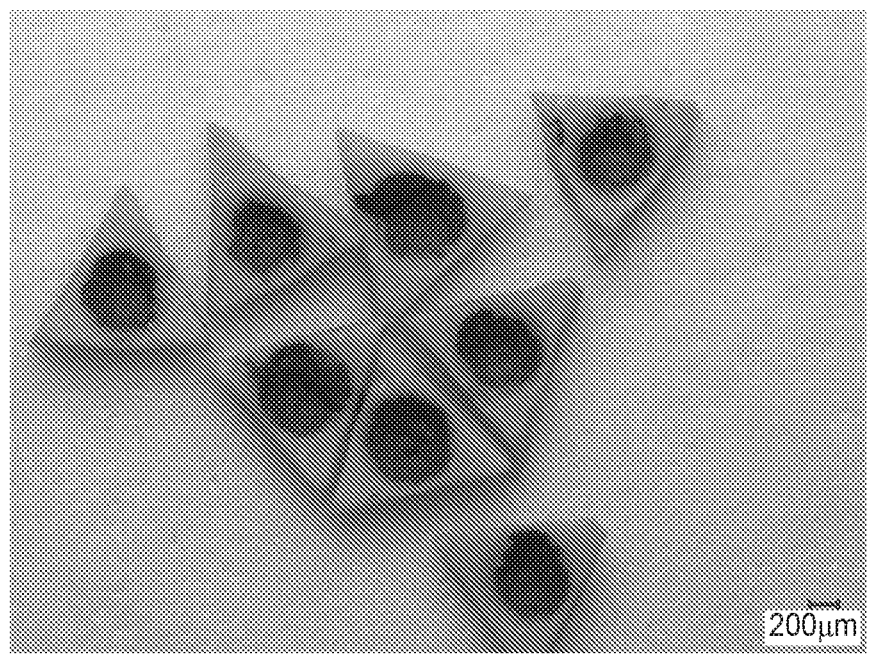
FIG. 7 is a digital micrograph of functional abrasive particles prepared according to Example 1.

Each of the resulting magnetizable abrasive particles contained a magnetizable core, as shown in the FIG. 7.

Example 2

SAP1 was pre-treated as follows: SAP1 (approximately 50 grams) was added to approximately 100 grams of an aqueous solution containing 0.2% REP. After 2 minute of soaking in the solution, SAP1 was removed from the solution with a filter, dried at 120° C. for 2 minutes and then cured at 150° C. for 1 minute.

PR1 (5 grams) and IO (5 grams) was mixed in a plastic container, 100 grams of 5% CB aqueous solution were added and the mixture was stirred with a mechanical mixer (obtained as IKA EUROSTAR POWER CONTROL-VISC STIRRER from IKA-Werke GmbH & Co. KG, Staufen, Germany) for 20 minute to get a uniform dispersion. Pre-treated shaped abrasive grains (50 grams) were added into the dispersion, and the resulting mixture was stirred for 5 minutes. The redundant solution was removed from the container. The abrasive grains were dried at 23° C. for 2 hours then at 80° C. for 1 minute. The abrasive grains were rinsed with tap water for 2 minutes, then dried at 80° C. for 1 minute and 100° C. for 1 minute.

Figure 8:
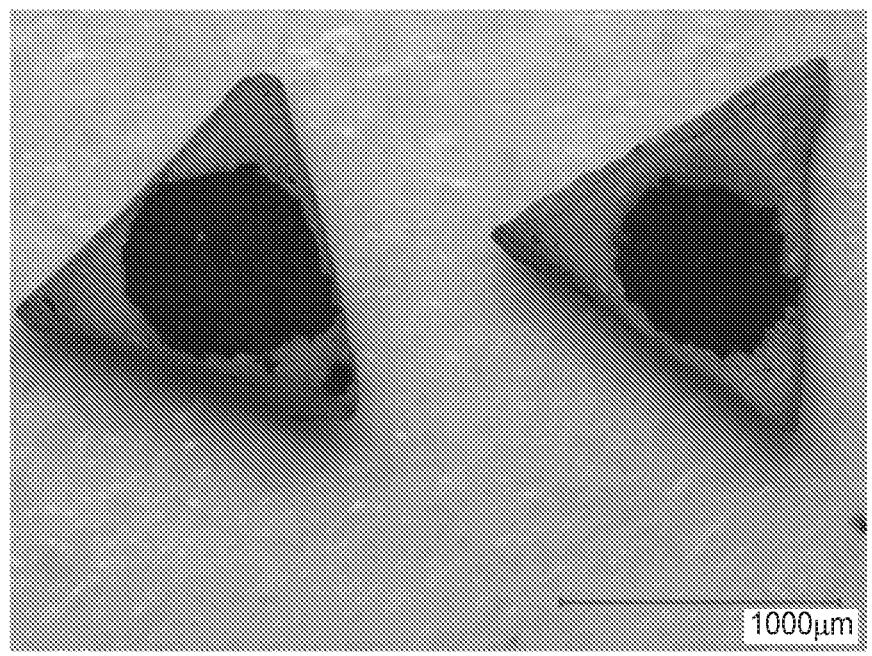
FIG. 8 is a digital micrograph of functional abrasive particles prepared according to Example 2.

Each of the resulting magnetizable abrasive particles contained a magnetizable and conductive core. Resulting magnetizable abrasive particles are shown in FIG. 8.

Example 3

SAP1 was pre-treated as follows: SAP1 (approximately 50 grams) was added to approximately 100 grams of an aqueous solution containing 0.2% REP. After 2 minutes of soaking in the solution, SAP1 was removed from the solution with a filter, dried at 120° C. for 2 minutes and then cured at 150° C. for 1 minute.

Tin powder (5 grams, 99.8%, obtained from Aldrich Chemical, Milwaukee, Wis.) powder and PR1 (5 grams) powder was mixed in a plastic container, stirred with a mechanical mixer (described in EXAMPLE 2) for 20 minutes to get a uniform powder mixture. Pre-treated shaped abrasive grains (500 grams) were added into the powder mixture, and the resulting mixture was stirred for 5 minutes. The abrasive grains were recovered through a standard 48 mesh sieve (obtained from W. S. Tyler, Inc., Mentor, Ohio). The abrasive grains were heated at an oven at 100° C. for 1 minute. The abrasive grains were rinsed with tap water for 2 minutes, then dried at 80° C. for 1 minute and 100° C. for 1 minute.

Figure 9:
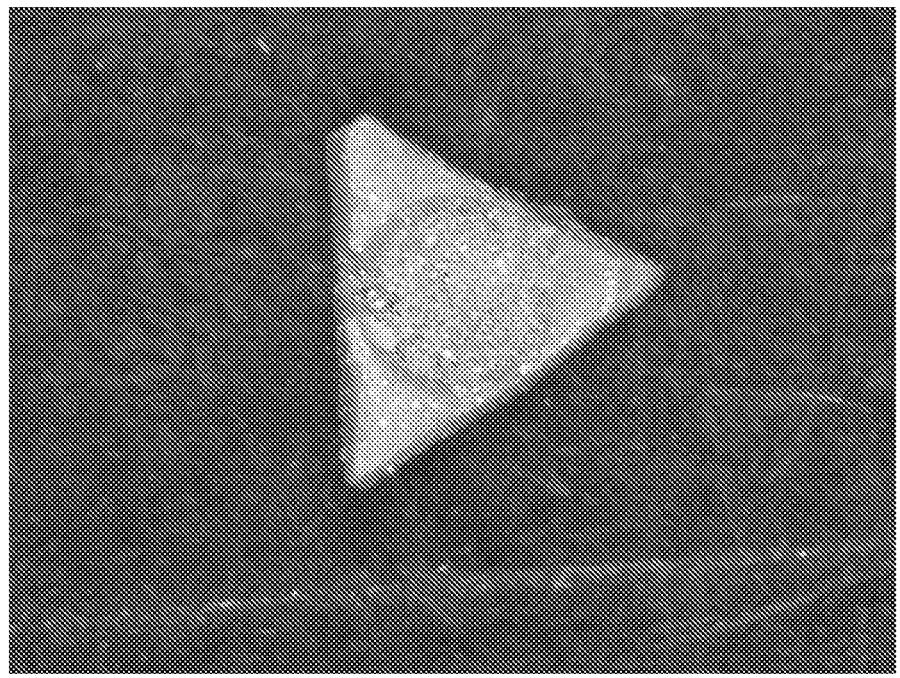
FIG. 9 is a digital micrograph of functional abrasive particles prepared according to Example 3.

Resulting electrically conductive abrasive particles are shown in FIG. 9.

Example 4

The procedure generally described in Example 3 was repeated, with the exception that 5 grams of tin powder was replaced with 5 grams of copper powder (obtained from Aldrich Chemical, Milwaukee, Wis.).

Figure 10:
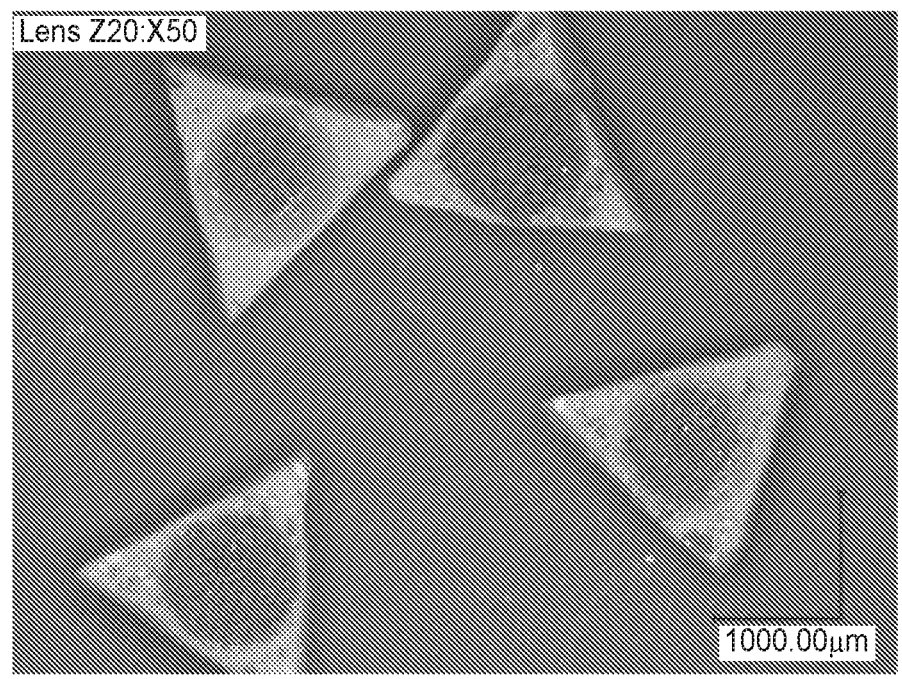
FIG. 10 is a digital micrograph of functional abrasive particles prepared according to Example 4.

Resulting electrically conductive abrasive particles are shown in FIG. 10.

Comparative Example A

The procedure generally described in Example 2 was repeated, with the exception that untreated abrasive particles were used (i.e., SAP1 was never subject to pre-treatment).

Figure 11:
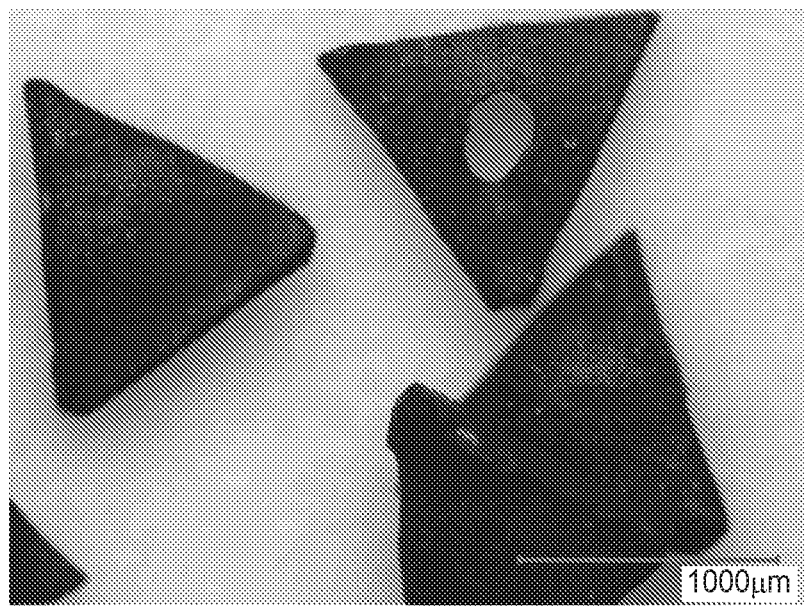
FIG. 11 is a digital micrograph of abrasive particles prepared according to Comparative Example A.

Resulting magnetizable abrasive particles are shown in FIG. 11. The entire surface of each of the magnetizable abrasive particles was covered with the magnetizable and conductive coating.

Example 5

Figure 12:
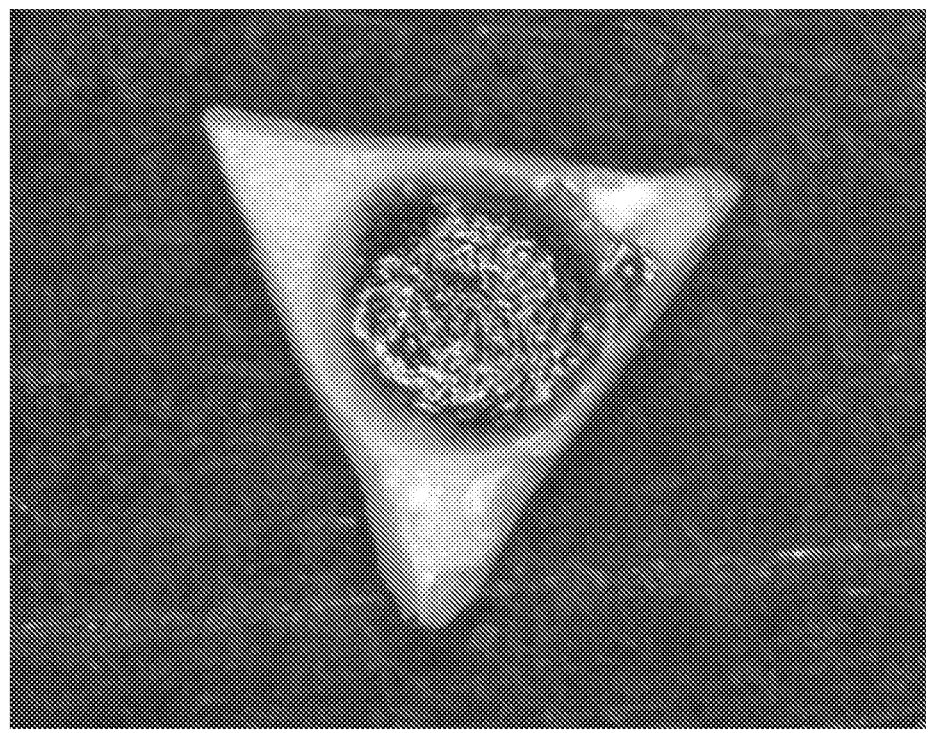
FIG. 12 is a digital micrograph of functional abrasive particles prepared according to Example 5.

IO (2 grams) was pre-mixed with 0.5 grams of PR2 under mechanical agitation for 2 minutes. A fine tipped needle was used to deposit enough of this mixture to fill the holes in the center of the SAP1 particles. The particles were then heated in an oven for 90 minutes at 100° C. and cooled to 23° C. Each of the resulting magnetizable abrasive particles contained a magnetizable core, as shown in FIG. 12.

Example 6

Figure 13:
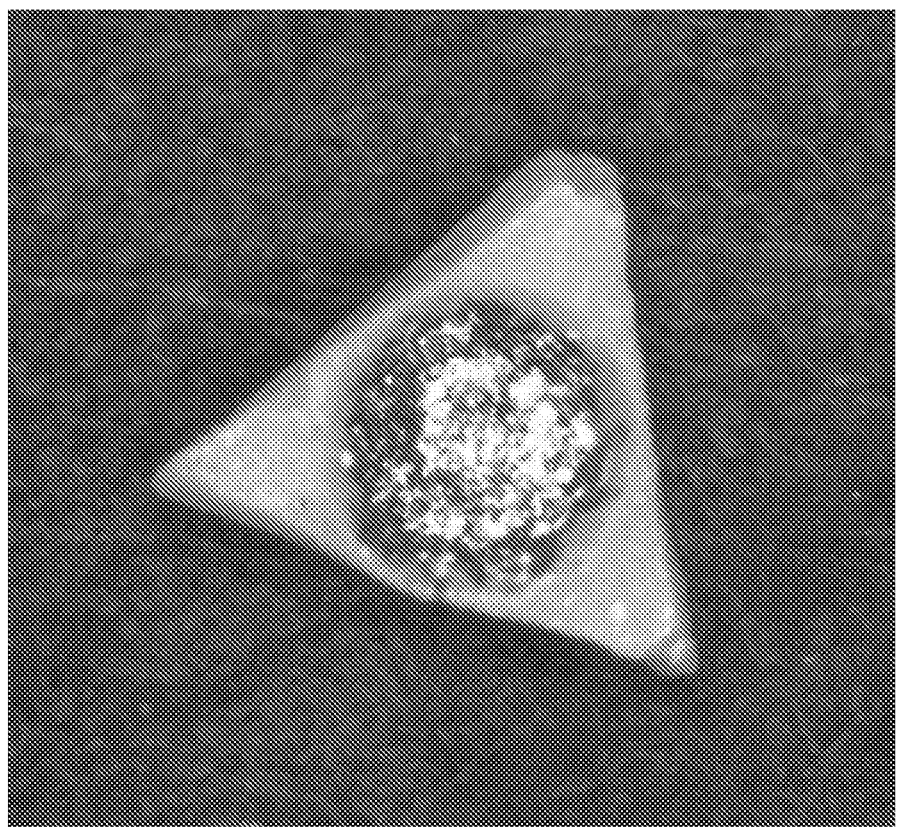
FIG. 13 is a digital micrograph of functional abrasive particles prepared according to Example 6.

SEN (2 grams) was pre-mixed with 0.5 grams of PR2 under mechanical agitation for 2 minutes. A fine tipped needle was used to deposit enough of this mixture to fill the holes in the center of the SAP1 particles. The particles were then heated in an oven for 90 minutes at 100° C. and cooled to 23° C. Each of the resulting magnetizable abrasive particles contained a magnetizable core, as shown in FIG. 13.

Magnetizable abrasive particles made from EXAMPLE 5 and EXAMPLE 6, respectively, were placed on a thin aluminum sheet and held over the center of a 6-inch (15.2-cm) diameter by 2-inch (5.1-cm) thick permanent neodymium magnet (with an average magnetic field of 0.6 Tesla) with north and south poles on opposite sides of the magnet separated by its thickness. The starting distance of the particles was 30 inches (76.2 cm) from the surface of the magnet. The aluminum sheet was then lowered at a rate of 0.5 inches/second (1.27 cm/second) until the magnetizable abrasive particles oriented upright. The magnetic field strength at the moment of orientation was measured as minimum magnetic field strength to achieve orientation by using a 5170 Gauss/Tesla Meter obtained from F.W. Bell, Milwaukie, Oreg. For magnetizable abrasive particles made from EXAMPLE 5, minimum magnetic field strength to achieve orientation was measured as 0.060 Tesla. For magnetizable abrasive particles made from EXAMPLE 6, minimum magnetic field strength to achieve orientation was measured as 0.023 Tesla.

Example 7

A 2.5-inch (6.35-cm) diameter round backing of Y-weight polyester sateen weave fabric (331 grams per square meter, obtained from Milliken & Company, LaGrange, Ga.), was coated with 100 g/m² of a make resin consisting of 52.05 parts of resole phenolic resin (obtained as GP 8339 R-23155B from Georgia Pacific Chemicals, Atlanta, Ga.), 45.45 parts of Calcium Metasilicate (obtained as 400 WOL-LASTOCOAT from NYCO Minerals Inc., Willsboro, N.Y.) and 2.5 parts of calcium carbonate (obtained as HUBER-CARB Q325 from Huber Carbonates, LLC, Atlanta, Ga.). The coated backing was placed on a 6 inches (15.2 cm)×3 inches (7.62 cm) surface of a 6 inches (15.2 cm)×3 inches (7.62 cm)×0.5 inch (1.27 cm) rare earth magnet (obtained as NEODYMIUM MAGNET N42 from Applied Magnets, Plano, Tex.) with north and south poles on opposite sides of the magnet separated by its thickness. The coated backing was placed with the resin coated surface facing up and the uncoated surface facing the magnet. 55 grams of abrasive particles with magnetizable core, made according to EXAMPLE 1, were drop coated onto the resin coated surface of the backing. The abrasive article were cured at 92° C. for 1 hour and then at 102° C. for 9 hours.

Figure 14:
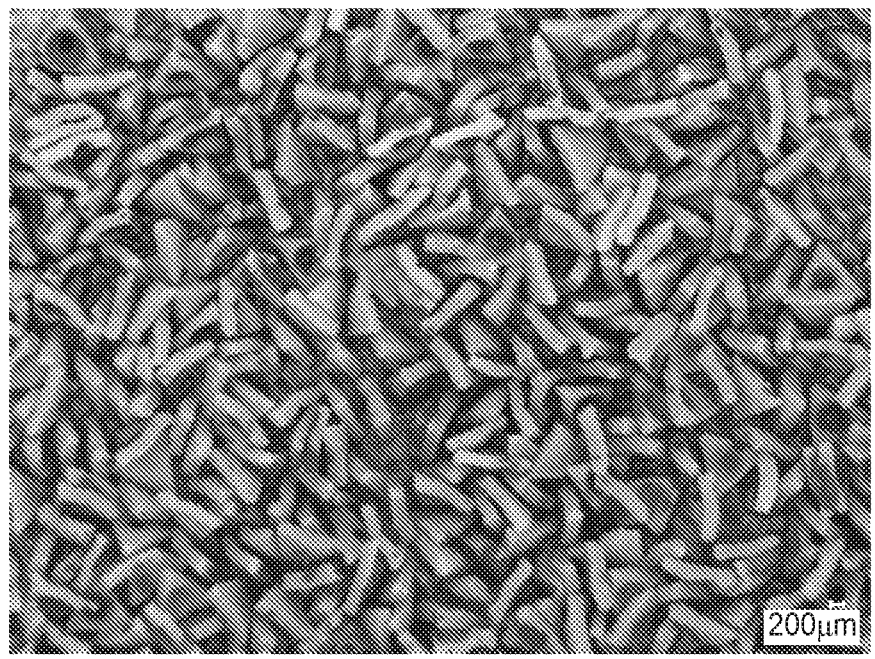
FIG. 14 is a digital micrograph of functional abrasive particles prepared according to Example 7.

Resulting magnetizable article is shown in FIG. 14.

Comparative Example B

The procedure generally described in EXAMPLE 7 was repeated, with the exception that SAP1 (without any filled core) was drop coated instead of abrasive particles with magnetizable core.

Figure 15:
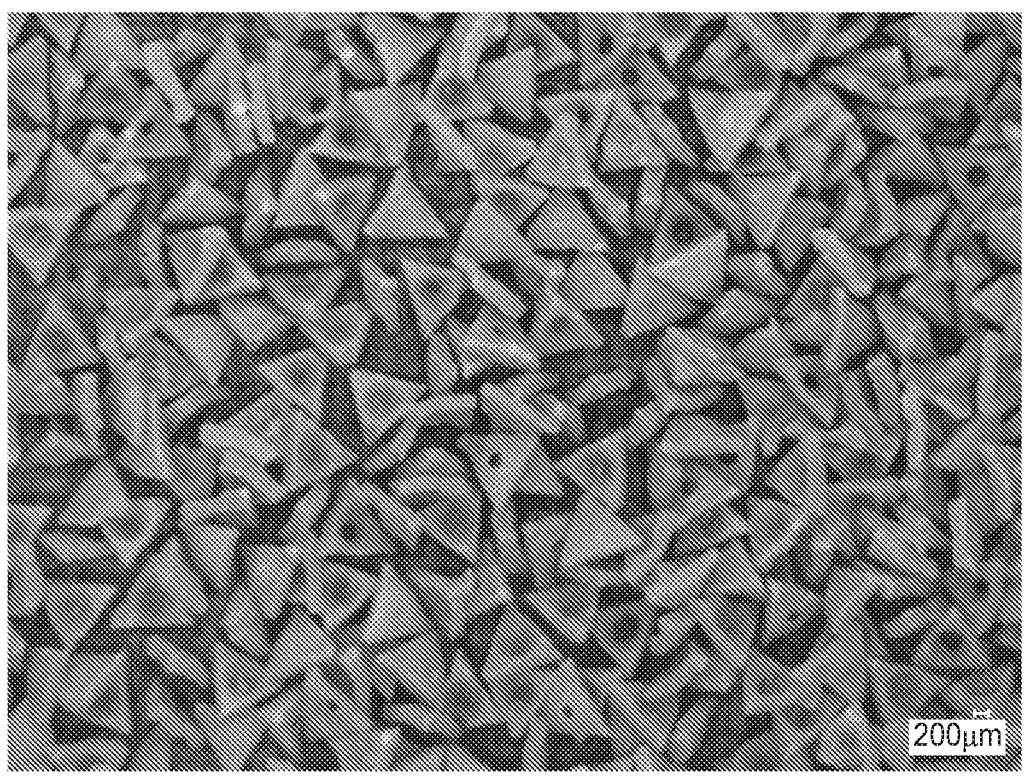
FIG. 15 is a digital micrograph of functional abrasive particles prepared according to Comparative Example B.

Resulting magnetizable abrasive article is shown in FIG. 15.

Particle Testing

A particle made from EXAMPLE 3 was placed a steel plate (10 inch (25.1 cm) wide×10 inch (25.1 cm) long×0.125 inch (0.318 cm) thickness) that was held at a fixed gap of 0.5 inch (1.27 cm) from another identical steel plate in the horizontal plane. Double-coated tape (obtained as 442KW from 3M Company, St. Paul, Minn.) was applied to the entire surface of the upper plate. A voltage was applied across the steel plates by a Model No. RUI 875A HV power supply for DEL, Valhalla, N.Y. The voltage started at 1 kilovolt and was slowly increased until the particle had jumped up and became affixed to the tape on the upper plate. The voltage required to have the particle jump up was noted as minimum voltage required. The procedure was repeated for 20 particles. The entire process was repeated for particles made from EXAMPLE 4 and for SAP2. The average minimum voltages required are reported in Table 2.

TABLE 2

|           | MINIMUM VOLTAGE REQUIRED (kilovolts) |
|-----------|--------------------------------------|
| EXAMPLE 4 | 8.5                                  |
| EXAMPLE 3 | 10.5                                 |
| SAP2      | 13.2                                 |

7 grams of particles made from EXAMPLE 3 were placed in a 45 ml capacity ceramic crucible. The crucible was placed into a microwave oven (obtained as MODEL WMC30516AS, from Whirlpool Company, Benton Harbor, Mich.). The sample was run on high power (1200 watts) for 60 seconds. The temperature was measured before and after the microwave process by an infrared thermometer (obtained as MODEL OS730K from Omega Engineering, Norwalk, Conn.). This same process was repeated for particles made from EXAMPLE 4 and SAP2 particles. Results are shown in Table 3.

TABLE 3

|           | Initial Temperature (° C.) | Final Temperature (° C.) |
|-----------|----------------------------|--------------------------|
| EXAMPLE 4 | 24.1                       | 99.7                     |
| EXAMPLE 3 | 24.1                       | 84.7                     |
| SAP2      | 24.0                       | 63.1                     |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A functional abrasive particle comprising a ceramic body having at least one hole extending therethrough, and a functional material at least partially disposed within the at least one hole, wherein the functional material comprises a first binder retaining a plurality of functional particles that are magnetizable, metallic, or a combination thereof.

2. The functional abrasive particle of claim 1, wherein the ceramic body comprises a shaped ceramic body.

3. The functional abrasive particle of claim 2, wherein the shaped ceramic body comprises a precisely-shaped ceramic body.

4. The functional abrasive particle of claim 1, wherein the ceramic body comprises a platelet having first and second opposed major facets connected to each other by a plurality of side facets, and wherein each one of said at least one hole extends from the first major facet to the second major facet.

5. The functional abrasive particle of claim 4, wherein the functional material completely fills the at least one hole.

6. The functional abrasive particle of claim 1, wherein the functional particles are magnetizable.

7. The functional abrasive particle of claim 6, wherein the functional particles comprise an alloy of iron, silicon, and aluminum.

8. The functional abrasive particle of claim 1, wherein the functional particles are metallic.

9. The functional abrasive particle of claim 1, wherein the first binder comprises an organic binder.

10. A plurality of functional abrasive particles according to claim 1.

11. An abrasive article comprising a plurality of abrasive particles retained in a second binder, wherein at least a majority of the abrasive particles comprise functional abrasive particles according to claim 1.

12. An abrasive article according to claim 11, wherein the abrasive article comprises a bonded abrasive wheel.

13. An abrasive article according to claim 11, wherein the abrasive article comprises a coated abrasive article, wherein the coated abrasive article comprises an abrasive layer disposed on a backing, and wherein the abrasive layer comprises the second binder and the plurality of abrasive particles.

14. An abrasive article according to claim 11, wherein the abrasive article comprises a nonwoven abrasive, wherein the nonwoven abrasive comprises a nonwoven fiber web having an abrasive layer disposed on at least a portion thereof, and wherein the abrasive layer comprises the binder material and the plurality of abrasive particles.

15. An abrasive article according to claim 11, wherein most of the functional abrasive particles are aligned parallel to each other.

* * * * *

UNITED STATES PATENT AND TRADEMARK OFFICE
CERTIFICATE OF CORRECTION

PATENT NO. : 10,774,251 B2  
APPLICATION NO. : 16/342770  
DATED : September 15, 2020  
INVENTOR(S) : Joe Eckel et al.

Page 1 of 1

It is certified that error appears in the above-identified patent and that said Letters Patent is hereby corrected as shown below:

In the Specification

Column 3
Line 18, Delete "with" and insert -- within --, therefor.

Column 8
Line 41, Delete "2008/U.S. Pat. No. 0,289,262" and insert -- 2008/0289262 --, therefor.

Column 10
Line 17 (Approx.), Delete "(Can" and insert -- (Carr --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*